June 30, 1925.  
W. J. McPHEE  
BEE BOARD  
Filed July 11, 1924
1,544,468
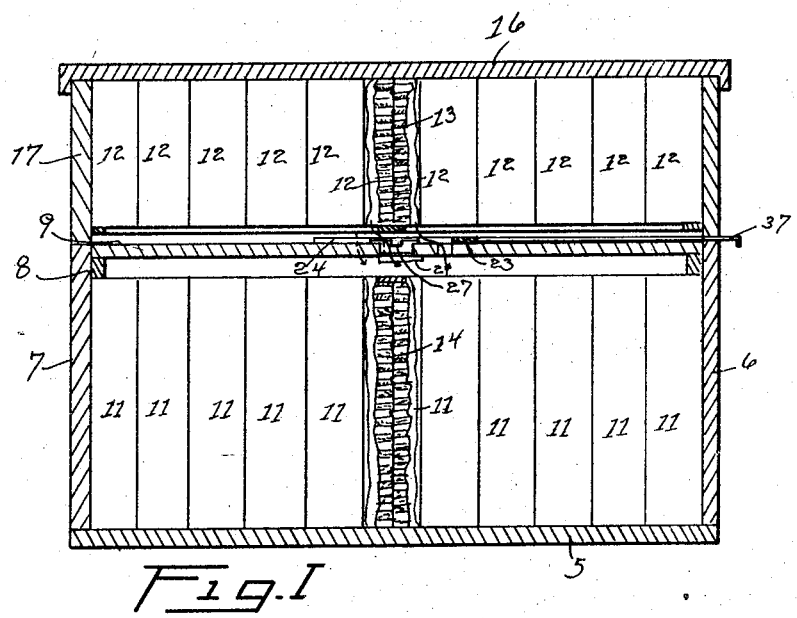
Fig. I
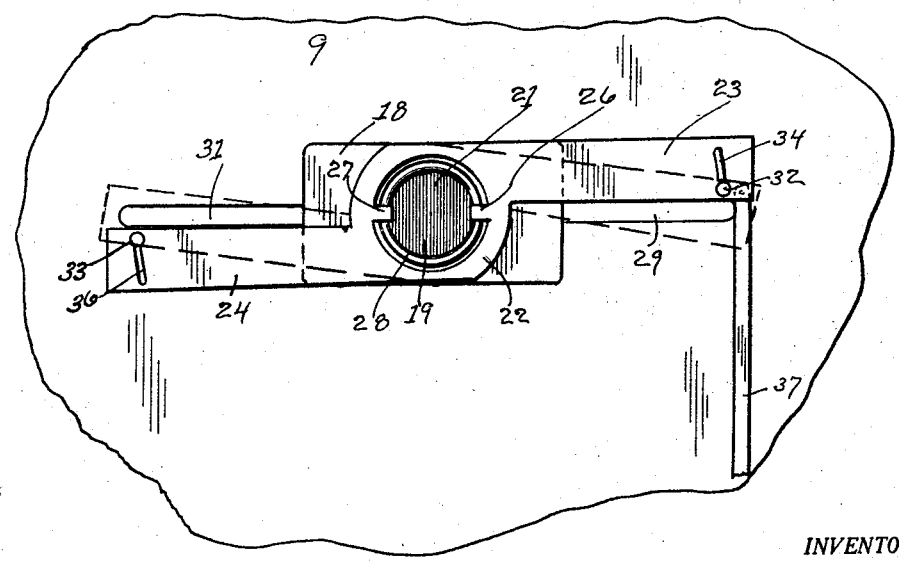
Fig. II
INVENTOR.  
W. J. McPHEE  
BY Victor J. Evans  
ATTORNEY Patented June 30, 1925.

1,544,468

UNITED STATES PATENT OFFICE.

WILLIAM J. McPHEE, OF LAKESIDE, OREGON.

BEE BOARD.

Application filed July 11, 1924. Serial No. 725,470.

*To all whom it may concern:*

Be it known that I, WILLIAM J. McPHEE, a citizen of the United States, residing at Lakeside, in the county of Coos and State of Oregon, have invented new and useful Improvements in Bee Boards, of which the following is a specification.

This invention relates to improvements in bee boards and has particular reference to means for providing an entrance for the bees through a bee board thereby eliminating the necessity of removing the bee board after a stack of supers has been taken away, and a new stack placed thereon.

Another object is to provide a device of this character which is cheap to manufacture, and one which may be applied to the ordinary bee board without materially altering the construction of the same.

A further object is to provide means for manipulating the device from a point outside the hive within which the bee board is placed.

Other objects and advantages will be apparent during the course of the following description.

In the accompanying drawings forming a part of this specification, and in which like numerals are employed to designate like parts throughout the same, Figure I is a vertical cross-section of a hive having my improved bee board mounted therein, and Figure II is an enlarged detail view showing my improved bee escape.

Heretofore, it has been customary to lift one edge of the first super above the hive, insert a bee board and then drop the super back into place. This operation always resulted in the crushing of a number of the bees, and at the same time greatly exciting the bees. I have therefore sought to provide means whereby the bee board may be left in the hive at all times, which board will have auxiliary openings therein so that the bees can pass up through the board and into the super for the purpose of forming honey, in the individual boxes positioned in the super. It is also customary to employ a bee escape in the ordinary bee board so that after the same has been placed between the hive and the super, the bees will escape from the super into the hive, but cannot return into the super, the result being that after a bee board has been installed for twenty-four hours all of the bees will have returned to the hive with the result that the super may be removed without any of the bees being left therein.

It is often necessary to replace a new super and remove the bee board with the result that the operator is very liable to be stung.

I have provided means whereby this will not happen and by referring to the drawings it will be noted that the numeral 5 designates the base of a hive, and the numerals 6 and 7 the sides thereof.

It is of course obvious that end walls are provided. A cleat 8 is positioned adjacent the top edge of the hive thus formed, upon which I place my improved bee board 9.

At 11, I have shown the customary frame for holding the brood, while the numeral 12 designates the customary boxes for holding the comb and honey to be stored therein by the bees. This comb and honey is designated at 13, while the brood comb is shown at 14.

A cover 16 is placed upon the super 17, which encloses the boxes 12. By now referring to Figure II it will be noted that I have shown a bee escape 18 which consists of a plate having an opening 19 therein below which is placed a second plate 21, which second plate is below the lower plane of the bee board. The construction of this type of bee escape is common and needs no further comment.

At 22 I have shown a ring portion having shutters 23 and 24 secured thereto, while at 26 and 27 I have shown lugs adapted to engage the ring 28 of the bee escape. At 29 and 31 I have shown openings in the bee board 9, through which openings the bees may pass. The shutters 23 and 24 are guided by pins 32 and 33 moving in slots 34 and 36, respectively. An operating lever 37 is pivotally connected to one of the shutters.

The operation of my device is as follows:—

When it is desired to exclude the bees from the super structure, the lever 37 is moved so as to cause the shutters 23 and 24 to take the dotted line position of Figure II. This prevents any more bees from coming up through the bee board with the result that the bees above the board will escape through the opening 19 into the hive. After a new super has been placed upon the hive the lever 37 may be again operated so as to move the shutters to their full line position with the result that the bees may immediately travel upward into the supers.

It is to be understood that the form of my invention, herewith shown and described is to be taken as a preferred example of the same and that various changes in the shape, size and arrangement of parts may be resorted to without departing from the spirit of the invention or the scope of the subjoined claim.

Having thus described my invention, I claim:—

In combination with a bee board having a bee escape positioned therein, and further having openings therein, of a ring rotatably secured to said bee escape, shutters secured to said ring, and means for operating said shutters in the manner specified.

In testimony whereof I affix my signature.

WILLIAM J. McPHEE.